Patented Mar. 10, 1953

2,631,098

UNITED STATES PATENT OFFICE 2,631,098

PRODUCTION OF THERMOSETTING PHENOL-ALDEHYDE RESIN CONDENSATION PRODUCTS

Donald V. Redfern, Seattle, Wash., assignor to American-Marietta Company, Adhesive, Resin and Chemical Division, Seattle, Wash., a corporation of Illinois No Drawing. Application November 4, 1948, Serial No. 58,373

35 Claims. (Cl. 92—21)

The present invention relates to the production of thermosetting phenol-aldehyde resin adhesives which are characterized by relatively short setting periods whereby the resin adhesive is converted from the soluble stage to the insoluble, infusible stage.

It has been discovered that the reactivity at hot press temperatures of the phenol-aldehyde resin adhesives may be greatly increased by prolonging, expanding or widening the condensation reaction of the resin in its water-soluble phase with the consequent shortening and moving along of the final reaction, that is, the conversion of the herein produced resins from the water-soluble stage into an insoluble, infusible stage.

In the present specification where it is stated the product is soluble in water it is to be understood that reference is made to the salt of the resin as found in an alkaline solution. If the solution is neutralized, then the neutral resin is for all practical purposes insoluble in water.

It has been proposed in applicant's copending application Serial No. 772,016, now Patent No. 2,457,493, reissued as Reissue No. 23,347, to produce a thermosetting phenol-aldehyde resin condensation product by forming an aqueous mixture of a phenol and an aldehyde and an alkaline catalyst, the latter accelerating the formation of the resin reaction-product on heating, the molar ratio of the aldehyde to the phenol varying from 1:1 to 3:1, and then reacting said mix to produce a water-soluble phenol-aldehyde reaction-product, the viscosity of the latter increasing during the initial reaction period, said increase in viscosity being indicative of the advancement of the water-soluble reaction-product to the stage where the water-soluble state terminates. After the initial reaction stage, there is added to the reaction-product a further amount of alkaline material and the alkaline-treated resin reaction-product is further condensed. This is repeated for a number of times. After the addition of each increment of alkaline material, there is a reduction in the viscosity of the water-soluble resin reaction-product and the tendency of the water-soluble reaction-product to progress to the water-insoluble stage. This permits a further condensation of the resin reaction-product without conversion of the latter to a water-insoluble stage. These additions of the alkali are terminated while the resin reaction-product is in a water-soluble stage and the aqueous solution of the water-soluble resin reaction-product shows a precipitate upon the addition of ethanol.

In said prior process, the increase of viscosity of the water-soluble reaction-product is indicative of its tendency to progress to a water-insoluble reaction-product and the viscosity is progressively reduced by the addition of increments of alkaline material which permits further condensation and further advancement of the resin reaction-product toward, but never attaining, an insoluble, infusible stage.

In accordance with the present invention, the ratio between the aldehyde and the phenol is greatly reduced, said ratio varying between one mole of the aldehyde to one mole of the phenol to one and one-half moles of the aldehyde as, for example, formaldehyde, to one mole of the phenol. With this small ratio of aldehyde to phenol, upon condensation the resin becomes insoluble in its aqueous alkaline solution when cooled to 25° C. The resin may then be solubilized by the addition of further alkaline material. On further condensation, the resin again becomes insoluble and a further addition of alkaline material is necessary in order to resolubilize the resin in the aqueous alkaline solution. These alternate steps are continued until the resin is permanently ethanol and water-soluble. In said prior application, the viscosity of the aqueous alkaline reaction-product increases before the resin becomes insoluble and this increase in viscosity is taken as the point for the addition of further alkali. However, in accordance with the present method of preparing the phenol-aldehyde resin condensation product, the point of insolubility of the alkaline resin in the aqueous alkaline solution after condensation is indicative of the necessity of adding more alkaline material in order to resolubilize the resin in the aqueous alkaline solution. However, after the resin has become permanently ethanol and water-soluble, its viscosity can be reduced by the addition of an alkaline material followed by a heating and/or condensation step, the alkaline addition functioning to decrease the viscosity of the resin which permits further heating and/or condensation to further advance the resin towards its insoluble, infusible state, but such alternate steps are always discontinued before said latter state is attained.

More specifically, in accordance with the present invention, a mixture of a phenol, an aldehyde and an alkaline material which functions as a catalyst in an aqueous solution, is heat-treated to produce a phenol-aldehyde condensation product, the ratio of the aldehyde to the phenol varying between one mole of the aldehyde to one mole of the phenol to one and one-half moles of the aldehyde to one of the phenol, the initial amount of alkaline material being sufficient to maintain the resin condensation product soluble in the aqueous alkaline solution in which the reaction between said constituents occurs.

The resulting mixture is heat-treated to form the initial condensation product and samples are taken of the initial condensation product to ascertain the progress of the condensation reaction. When a sample of the initial condensation product is cooled to 25° C. and the sample becomes cloudy, this is an indication that the condensation of the initial phenol-aldehyde condensation product cannot be carried any further without precipitating the alkaline salt of the resin from the aqueous alkaline solution at room temperature, that is, 25° C. In order to further advance the condensation of the initial resin reaction-product in accordance with the basic concept of the present invention, the initial aqueous phenol-aldehyde condensation product in which the alkaline salt of the resin has been thrown out of solution or is about to be thrown out of solution, is solubilized and put back into solution by adding a further quantity of alkaline solubilizing medium, and again heat-treating as by refluxing until another sample of the aqueous solution when cooled to 25° C. exhibits cloudiness, showing the alkaline salt of the phenol-aldehyde resin as, for example, phenol-formaldehyde resin, has become, or is about to become, or a portion thereof has become insoluble in its aqueous alkaline solution. This procedure is repeated by alternately adding an alkaline material, condensing as by heating until a sample of the condensed aqueous aldehyde resin reaction-product becomes cloudy at about 25° C. when resolubilization is effected by adding alkaline material. Each time this procedure is repeated until the resin is advanced toward the end of the stage where it is capable of being quickly converted at usual hot press temperatures as, for example, temperatures varying from about 240° F. to 290° F. or higher, into a permanently infusible, insoluble state. However, the alternate alkaline treatment and heat condensation steps are never carried to the point where the addition of the alkali and the heat condensation converts the resin to its insoluble, infusible state. The step additions of alkaline material are continued until the resin becomes permanently ethanol and water-soluble, that is, on further heating and/or condensation of the resin, the viscosity of the alkaline aqueous resin solution increases but the alkaline salt as, for example, the alkali salt of the resin remains ethanol and water-soluble. Further additions of alkaline material may be made to the resin solution to decrease the rising viscosity thereof, and the condensation carried further. The essential criteria is that the condensation of the resin is not carried beyond the stage where the alkaline salt of the resin is both ethanol and water-soluble. Preferably, although not necessarily, the additions of the alkaline material which has been used in the process, including the initial amount of alkaline material used in the production of the initial condensation product is equivalent to the alkalinity produced by between 0.20 and 1.20 moles of sodium hydroxide per molecule of phenol, said ratio of the total alkaline material to the phenol being preferably maintained while maintaining the ratio of the aldehyde to the phenol between one mole of aldehyde to one mole of phenol and one and one-half moles of aldehyde to one mole of phenol. As indicated, it is not desired to be strictly limited to the molar ratio of the alkaline material to the phenol, since it is the low aldehyde-phenol ratio which permits the resin to remain ethanol and water-soluble after the repeated condensation in successive steps of the phenol-aldehyde condensation product to the point where on cooling to 25° C., the phenol-aldehyde condensation product is insolubilized or is about to be insolubilized and is thrown out or is about to be thrown out of the aqueous alkaline solution formed as a result of the initial condensation step and the following alternate condensation steps. Broadly the total amount of alkaline material used in carrying out the process, including the initial amount of alkaline material used in the production of the initial condensation product, is equivalent to the alkalinity produced by between 0.10 and 2.00 moles of sodium hydroxide per mole of phenol, said ratio of the total alkaline material to the phenol being preferably maintained while maintaining the ratio of the aldehyde to the phenol between one mole of aldehyde to one mole of phenol and one and one-half moles of aldehyde to one mole of phenol. The alkaline material used in the production of the initial phenol-aldehyde condensation product is preferably present in an amount equivalent to the alkalinity produced by between 0.049 to 0.125 mole of sodium hydroxide per mole of phenol and broadly this range is 0.025 to 0.20 mole of sodium hydroxide per mole of phenol.

The addition of alkaline material in small quantities in stepwise fashion, followed by a condensation of the phenol-aldehyde reaction product after each addition of alkaline material, as for example an alkali hydroxide, is helpful in curbing side reactions such as the Cannizzaro reaction.

It has also been discovered that the water-soluble phenol-aldehyde resinous condensation particles of the present invention, when used in the processing of fibers in aqueous acid solution, are retained on the cellulose fibers in a substantially insoluble state, due to the fact that the resin of the present invention is further advanced towards the insoluble infusible C-stage than prior art resins, and are substantially insoluble in the aqueous acid slurry.

An indication of how far the resin is advanced is obtained by taking a drop of the resin of a volume of approximately $\frac{1}{10}$ of a milliliter, placing the resin on a hot plate at 285° F. and then stroking the resin with a spatula until the resin becomes non-tacky.

The resin of the present invention and particularly the condensation product of phenol $C_6H_5OH$ and formaldehyde sets at said temperature in 4 to 8 seconds, inclusive, while the prior art monohydric phenol-aldehyde resins and particularly the phenol $C_6H_5OH$ formaldehyde resin set in 15 to 25 seconds.

The invention will be specifically disclosed in connection with the following examples:

Example 1

A mixture is made of the following ingredients at room temperature, that is, 25° C.:

| | Grams |
|---|---|
| Phenol | 26.25 |
| Formaldehyde 37% | 28.30 |
| Water | 37.38 |
| Sodium hydroxide 50% | 1.37 |

The above mixture is gradually heated with continuous agitation to a reflux temperature of approximately 100° C. in 90 minutes. This refluxing is then continued for approximately 60 minutes at which time the aqueous solution of the resin has a pH of 9.35 and a sample of the resin when cooled to 25° C. becomes cloudy, indicating that the resin, that is, the sodium salt of the resin, is no longer soluble in the alkaline solution at a temperature of 25° C. Thereafter 1.05 grams of 50% sodium hydroxide are added. This addition of alkaline material functions to resolubilize the resin with the resulting aqueous alkaline solution of the resin having a viscosity of 0.25 poises and a pH of 9.65. The resulting aqueous alkaline solution of the resin is then refluxed for 45 minutes. A sample of the resin taken at this point and cooled to 25° C. becomes cloudy. Then the second addition of alkaline is made to the so-condensed aqueous alkaline solution, 50% sodium hydroxide being again added in an amount of 1.05 grams to bring the resin reaction-product in solution in its aqueous alkaline carrying medium, that is, to effect resolubilization of the condensed resin reaction-product. The resulting aqueous alkaline resin solution has a viscosity of 1.65 poises and a pH of 10.10. The resulting product is then refluxed at approximately 90° C. for 60 minutes. When a sample of the so-treated resin taken at different times during refluxing shows that on cooling to 25° C. the alkaline salt of the resin has become insoluble in the aqueous alkaline solution, a third increment of sodium hydroxide is added, namely, 4.60 grams of 50% sodium hydroxide. The resulting aqueous alkaline solution of the resin has a viscosity of 3.00 poises and a pH of 12.25. The temperature of the resulting reaction mixture is allowed to drop to approximately 70° C. and then maintained until a viscosity of 5.00 to 5.50 poises at 25° C. at a pH of 12.25 is obtained. Thereafter the aqueous solution of the resin reaction-product is cooled to room temperature, that is, 25° C. The alkaline solution of the resin at this point is both water-soluble and ethanol-soluble.

In this example, the molar ratio of the formaldehyde to the phenol is 1.25 moles of formaldehyde to one mole of phenol. The ratio of the alkaline material to the phenol used in producing the initial reaction product, said alkaline material being expressed as sodium hydroxide, is 0.061 moles of sodium hydroxide to one of phenol. The ratio of the total alkaline material used in carrying out the process to the phenol, said total amount of alkaline material being expressed as sodium hydroxide, is 0.36 mole of sodium hydroxide to one mole of phenol. This total alkali includes the initial amount of alkaline material functioning as the catalyst in the initial mix. Alkaline materials other than sodium hydroxide, as more specifically herein set forth, may be used in an amount to produce the alkalinity produced by the sodium hydroxide and, therefore, is the full equivalent of the sodium hydroxide.

Example 2

A mixture is made of the following ingredients at room temperature, that is, 25° C.:

| | Grams |
|---|---|
| Phenol | 25.20 |
| Formaldehyde 37% | 27.14 |
| Water | 35.83 |
| Sodium hydroxide 50% | 1.31 |

The mixture containing the initial alkaline phenol-formaldehyde condensation product is condensed and thereafter the resulting reaction-product is condensed in exactly the same manner as in Example 1, the following amounts of alkaline material, expressed as sodium hydroxide, being used at each addition of alkaline material:

| | Grams |
|---|---|
| Sodium hydroxide 50% | 1.01 |
| Sodium hydroxide 50% | 1.01 |
| Sodium hydroxide 50% | 8.50 |

After the addition of the final alkaline increment, the resulting aqueous alkaline resin solution is cooked at 90° C. until a viscosity of 30.00 to 40.00 poises is obtained.

In this example, the molar ratio of the formaldehyde to the phenol is 1.25 moles of formaldehyde to one mole of phenol. The ratio of the alkaline material to the phenol used in producing the initial reaction-product, said alkaline material being expressed as sodium hydroxide, is 0.061 mole of sodium hydroxide to one of phenol. The ratio of the total alkaline material used in carrying out the process to the phenol, said total amount of alkaline material being expressed as sodium hydroxide, is 0.55 mole of sodium hydroxide to one mole of phenol. This total alkali includes the initial amount of alkaline material functioning as the catalyst in the initial mix. Alkaline materials other than sodium hydroxide, as more specifically herein set forth, may be used in an amount to produce the alkalinity produced by the sodium hydroxide and, therefore is the full equivalent of the sodium hydroxide.

Example 3

A mixture is made of the following ingredients at room temperature, that is, 25° C.:

| | Grams |
|---|---|
| Phenol | 28.05 |
| Formaldehyde 37% | 30.10 |
| Water | 28.75 |
| Sodium hydroxide 50% | 1.45 |

The mixture containing the initial alkaline phenol-formaldehyde condensation product is condensed and thereafter the resulting reaction-product is condensed in exactly the same manner as in Examples 1 and 2, the following amounts of sodium hydroxide being used at each respective addition of alkali:

| | Grams |
|---|---|
| Sodium hydroxide 50% | 1.12 |
| Sodium hydroxide 50% | 1.12 |
| Sodium hydroxide 50% | 9.41 |

After the addition of the final increment of alkaline material expressed as sodium hydroxide, the resin is cooked at 70° C. until a viscosity of approximately 3.00 poises is obtained.

In this example, the molar ratio of the formaldehyde to the phenol is 1.25 moles of formaldehyde to one mole of phenol. The ratio of the alkaline material to the phenol used in producing the initial reaction-product, said alkaline material being expressed as sodium hydroxide, is 0.061 mole of sodium hydroxide to one of phenol. The ratio of the total alkaline material used in carrying out the process to the phenol, said total amount of alkaline material being expressed as sodium hydroxide, is 0.55 mole of sodium hydroxide to one mole of phenol. This total alkali includes the initial amount of alkaline material functioning as the catalyst in the initial mix. Alkaline materials other than sodium hydroxide, as more specifically herein set forth, may be used in an amount to produce the alkalinity produced by the sodium hydroxide and, therefore, is the full equivalent of the sodium hydroxide.

*Example 4*

A mixture is made of the following ingredients at room temperature, that is, 25° C.:

| | Grams |
|---|---|
| Phenol | 26.25 |
| Formaldehyde 37% | 23.35 |
| Water | 52.51 |
| Sodium hydroxide 50% | 1.37 |

The mixture is gradually heated with continuous agitation to a reflux temperature of approximately 100° C. for approximately 60 minutes. At this point a sample shows the resin is no longer soluble in the aqueous alkaline solution at 25° C. In order to solubilize the resin in the aqueous alkaline solution, 1.05 grams of 50% sodium hydroxide are added. The so-treated phenol-formaldehyde condensation products is then further refluxed at a temperature of about 90° C. for approximately 120 minutes. During this heating period condensation of the resin reaction-product continues and at the end of 120 minutes a sample of the resin shows that it is no longer soluble in its aqueous alkaline solution at 25° C. Then a third addition of alkaline material is made. More specifically, 1.05 grams of 50% sodium hydroxide are again added to resolubilize the alkaline salt of the phenol-formaldehyde resin. The resulting mix is again refluxed at 90° C. for 120 minutes until a sample of the reacted mix when cooled to 25° C. shows the resin to be insoluble in its alkaline solution. The fourth addition of alkaline material is then made in the amount of 5.95 grams of 50% sodium hydroxide. The resin at this point is soluble in the alkaline solution and has a viscosity of less than 0.50 poise. The resin is then heat-treated at 100° C. for 60 minutes until it has attained a viscosity of approximately 30 poises. The resin solution is then cooled to room temperature, that is, 25° C.

In this example, the molar ratio of the formaldehyde to the phenol is 1.03 moles of formaldehyde to one mole of phenol. The ratio of the alkaline material to the phenol used in producing the initial reaction-product, said alkaline material being expressed as sodium hydroxide, is 0.061 mole of sodium hydroxide to one of phenol. The ratio of the total alkaline material used in carrying out the process to the phenol, said total amount of alkaline material being expressed as sodium hydroxide is 0.42 mole of sodium hydroxide to one mole of phenol. This total alkali includes the initial amount of alkaline material functioning as the catalyst in the initial mix. Alkaline materials other than sodium hydroxide, as more specifically herein set forth, may be used in an amount to produce the alkalinity produced by the sodium hydroxide and, therefore, is the full equivalent of the sodium hydroxide. The resulting resin is ethanol and water soluble.

*Example 5*

A mixture is made of the following ingredients at room temperature, that is, 25° C.:

| | Grams |
|---|---|
| Phenol | 26.25 |
| Formaldehyde 37% | 34.00 |
| Water | 34.10 |
| Sodium hydroxide 50% | 1.37 |

The mixture is reacted in exactly the same manner as set forth in Examples 1 and 4 until the first point of insolubilization is attained in 160 minutes. At this point 3.15 grams of 50% sodium hydroxide are added. The mixture is kept at a heated state but at a reduced temperature of 80° C. for a period of 60 minutes with the result that the aqueous phenol-formaldehyde condensation product is further advanced. After about 60 minutes a sample thereof when cooled to 25° C. shows that the resin has become insoluble in its aqueous alkaline solution and, therefore, 2.10 grams of 50% sodium hydroxide are added. The resulting resinous mixture is then heat-treated for 60 minutes at 85° C. to further advance the condensation of the phenol-formaldehyde resin reaction-product until a viscosity of 10.00 poises is attained.

In this example, the molar ratio of the formaldehyde to the phenol is 1.50 moles of formaldehyde to one mole of phenol. The ratio of the alkaline material to the phenol used in producing the initial reaction product, said alkaline material being expressed as sodium hydroxide, is .061 mole of sodium hydroxide to one of phenol. The ratio of the total alkaline material used in carrying out the process to the phenol, said total amount of alkaline material being expressed as sodium hydroxide, is 0.30 mole of sodium hydroxide to one mole of phenol. This total alkali includes the initial amount of alkaline material functioning as the catalyst in the initial mix. Alkaline materials other than sodium hydroxide, as more specifically herein set forth, may be used in an amount to produce the alkalinity produced by the sodium hydroxide and, therefore, is the full equivalent of the sodium hydroxide. The final resin is ethanol and water soluble.

*Example 6*

A mixture is made of the following ingredients at room temperature, that is, 25° C.:

| | Grams |
|---|---|
| 3-5 xylenol | 122.6 |
| Formaldehyde 37% | 101.2 |
| Water | 197.2 |
| Sodium hydroxide | 5.55 |

The above mixture is agitated and heated until a temperature of 85° C. is attained in 150 minutes. During this period the reaction mixture forms a two-phase system. When the two-phase system is formed, 4.25 grams of 50% sodium hydroxide are added. On the addition of the alkaline material, the two-phase system disappears but forms again on further condensation. Six additions, each of 4.25 grams of sodium hydroxide are added. After each addition, the solubilized resin is heated-treated to further advance the resin, that is, to further condense the resin. After the six additions of sodium hydroxide the resin is soluble in the alkaline solution and in ethanol, but not in water. The temperature of the reacting mix after six additions of sodium hydroxide as specified is dropped to 80° C. and there maintained for 20 minutes. After being further condensed for a period of 20 minutes at 80° C., 8.50 grams of 50% sodium hydroxide are added which functions to resolubilize the resin which becomes insoluble in the previous heating step. On this last addition, the resin solution becomes both ethanol and water soluble and has a viscosity of 3.00 poises. The condensation is then continued at 80° C. for 60 minutes until the solution has a viscosity of approximately 30.00 poises. The mixture is then cooled to a temperature of 25° C.

In this example, the molar ratio of the formaldehyde to the 3-5 xylenol is 1.25 moles of formaldehyde to one mole of 3-5 xylenol. The ratio of the alkaline material to the 3-5 xylenol used in producing the initial reaction-product, said alkaline material being expressed as sodium hydroxide, is 0.069 mole of sodium hydroxide to one of 3-5 xylenol. The ratio of the total alkaline material used in carrying out the process to the 3-5 xylenol, said total amount of alkaline material being expressed as sodium hydroxide, is 0.49 mole of sodium hydroxide to one of the 3-5 xylenol. The final resin is both water and ethanol soluble.

*Example 7*

A mixture is made of the following ingredients at room temperature, that is, 25° C.:

| | Grams |
|---|---|
| Cresylic acid | 108.13 |
| Formaldehyde 37% | 101.20 |
| Sodium hydroxide 50% | 10.00 |
| Water | 30.00 |

The mixture is agitated and heated at such a rate that a temperature of 98° C. is obtained in 100 minutes. At the end of this period the resin will form a cloudy two-phase system, indicating that the alkaline salt of the resin has been precipitated. On the addition of further alkaline ingredient the two-phase system disappears and forms again on further condensation of the resin. Over a period of 30 minutes there are eight distinct additions of sodium hydroxide, 7.5 grams of 12.5% solution of sodium hydroxide being added about every 3½ minutes. This addition of sodium hydroxide solubilizes the resin, and at this stage the resin is soluble in ethanol and in the alkaline solution, but not in water. A further addition of 75 grams of 12.5% sodium hydroxide solution is then made and on this addition the resin becomes both ethanol and water soluble and has a viscosity of less than 0.50 poise.

Thereafter the resin solution is refluxed at a temperature of approximately 100° C. for 120 minutes until it has obtained a viscosity of 27.0 poises. This heat condensation step advances the resin toward its insoluble and infusible state, but said state is never attained. Due to the presence of sufficient alkali, the resin does not become insoluble in the aqueous alkaline solution and, therefore, stays in solution; that is, the resin does not become insoluble. After the last refluxing step, 75 grams of water are added to produce a viscosity of approximately 1.50 poises. Thereafter the resin is condensed and further advanced toward the resin which will set into an infusible and insoluble state, but said state is never attained. The condensation produces a multiplication of linkages and there is, as a result of the condensation, long and more cross-chains of linkages. After the addition of water, the condensation is continued at refluxing temperature of about 100° C. until a viscosity of 5.00 of poises is attained. The resulting aqueous resin solution is cooled to about 25° C. at which point it has a viscosity of 8.00 to 10.00 poises and is both ethanol and water soluble. The cresylic acid used is a crude alkyl phenol with a distillation range between 199° C. and 225° C. and is known as Shell's type 2000.

In this example, the ratio of the formaldehyde to the cresylic acid is 1.25 moles of formaldehyde to one mole of cresylic acid. The ratio of the alkaline material to the cresylic acid used in producing the initial reaction-product, said alkaline material being expressed as sodium hydroxide, is 0.125 mole of sodium hydroxide to one of cresylic acid. The ratio of the total alkaline material used in carrying out the process to the cresylic acid, said alkaline material being expressed as sodium hydroxide, is 0.55 mole of sodium hydroxide to one mole of cresylic acid. This total alkali includes the initial amount of alkaline material functioning as the catalyst in the initial mix. Alkaline materials other than sodium hydroxide, as more specifically herein set forth, may be used in an amount to produce the alkalinity produced by the sodium hydroxide and, therefore, is the full equivalent of the sodium hydroxide.

*Example 8*

An ethanol-soluble and water-soluble resin may be made in accordance with the present invention from a mixture of a dihydroxy phenol as, for example, resorcinol, and a monohydroxy phenol having a distillation range between about 175° C. and about 225° C., said monohydroxy phenols including phenol per se, cresylic acid, xylenol including 3-5 xylenol, metacresol and mixtures of phenol and metacresol or mixtures of phenol and xylenol or mixtures of phenol, metacresol and 3-5 xylenol.

A mixture is made of the following ingredients at room temperature, that is, 25° C.:

| | Grams |
|---|---|
| Phenol | 70.5 |
| Resorcinol | 27.0 |
| Formaldehyde 37% | 101.2 |
| Water | 172.5 |
| Sodium hydroxide 50% | 5.55 |

On addition of the ingredients with agitation a strong exothermic reaction develops which advances the temperature of the resin mixture approximately 20° C. At the end of the exothermic reaction, the mixture is heated to 60° C. for 60 minutes. At the end of this period a gelatinous mass is formed in the aqueous alkaline solution produced from the water, sodium hydroxide and formaldehyde, said gelatinous mass indicating that the alkaline salt of the resin has become insoluble in the aqueous alkaline solution. The gelatinous insoluble mass is resolubilized by the addition of 12.7 grams of 50% sodium hydroxide solution. The resulting aqueous solution of the alkaline salt of the copolymerized phenol resorcinol resin has a viscosity of approximately 0.50 poises. The resin solution is then heated to 90° C. and the condensation continued for a period of 90 minutes until a viscosity of approximately 50 poises is obtained. This condensation step results in an increase in viscosity of the condensation product. A sample of the condensation product when cooled to 25° C. becomes cloudy indicating that the alkaline salt of the copolymerized resin is about to be thrown out of solution. In order to further condense the resin toward its insoluble and infusible state, that is, to increase the length of the linkages and produce more cross linkages and without throwing the resin out of its solution, 12.5 grams of 50% sodium hydroxide are added. On the addition of the sodium hydroxide, the resin becomes resolubilized and the viscosity is reduced to approximately 2.00 to 3.00 poises. The resolubilized resin is then further condensed at a temperature of 80° C. for a period of 60 minutes. At this point, the resin remains in solution in the aqueous alkaline solution. The resin has a viscosity of 7.50 to 10.00 poises. The finished resin is then cooled to room temperature, that is, 25° C. The final resin is both ethanol and water-soluble. In this example, the molar ratio of the formaldehyde to the total phenolic constituents is 1.25 moles of formaldehyde to one mole of the phenol constituents. The ratio of the alkaline material to the total phenol constituents used in producing the initial reaction-product, said alkaline material being expressed as sodium hydroxide, is 0.069 mole of sodium hydroxide to one mole of the phenol. The ratio of the total alkaline material used in carrying out the process to the total phenol constituents, said total amount of alkaline material being expressed as sodium hydroxide, is 0.39 mole of sodium hydroxide to one mole of the total phenol constituents, the latter including both the monohydroxy phenol and the dihydroxy phenol. Alkaline materials other than sodium hydroxide, as more specifically herein set forth, may be used in an amount to produce the alkalinity produced by the sodium hydroxide and, therefore, is the full equivalent of the sodium hydroxide.

*Example 9*

A mixture is made of the following ingredients at room temperature, that is, 25° C.:

|   | Grams |
|---|---|
| Phenol | 100 |
| Formaldehyde | 108 |
| Water | 131 |
| Sodium hydroxide 50% | 5.2 |

The mixture is heated to approximately 100° C. for a period of 90 minutes and then refluxed for a further period of 70 minutes. At this point the resin is insoluble in the aqueous alkaline solution. Four grams of 50% sodium hydroxide are added to resolubilize and then the resin is further refluxed for 30 minutes to insolubility. The sodium salt of the resin which has become insoluble and thrown out of solution is again brought into solution by the addition of 4 grams of sodium hydroxide. The resulting aqueous alkaline solution is then cooled to 90° C. and held there for 30 minutes when the alkaline salt of the resin is again thrown out of solution. Sodium hydroxide is then added in the amount of 5.6 grams. The resulting aqueous solution is cooled to 75° C. and held there for 30 minutes and then cooled to 40° C. The viscosity of the final solution varies between 4.75 and 5 poises. In this example, the molar ratio of the formaldehyde to the phenol is 1.25 moles of formaldehyde to one mole of the phenol. The ratio of the alkaline material to the phenol used in producing the initial reaction-product, said alkaline material being expressed as sodium hydroxide, is 0.061 mole of sodium hydroxide to one mole of phenol. The ratio of the total alkaline material used in carrying out the process to the phenol, said total amount of alkaline material being expressed as sodium hydroxide, is 0.22 mole of sodium hydroxide to one mole of phenol. This total alkali includes the initial amount of alkaline material functioning as the catalyst in the initial mix. Alkaline materials other than sodium hydroxide, as more specifically herein set forth, may be used in an amount to produce the alkalinity produced by the sodium hydroxide and, therefore, is the full equivalent of the sodium hydroxide.

*Example 10*

A mixture is made of the following ingredients at room temperature, that is, 25° C.:

|   | Grams |
|---|---|
| Furfural | 19.32 |
| Phenol | 18.70 |
| Sodium hydroxide 50% | 0.80 |
| Water | 2.10 |

The mixture is refluxed at approximately 103° C. for about 120 minutes until a viscosity of approximately 0.50 poise is obtained. Then 14.80 grams of 4 N sodium hydroxide are added and the refluxing continued for 90 minutes, at which point the alkaline salt of the resin becomes insoluble in the aqueous alkaline solution resulting from the initial mix. The aqueous solution of the resin has a viscosity of 10 to 11 poises. The resin is resolubilized by adding 29.60 grams of 4 N sodium hydroxide, the viscosity decreasing on the addition of the alkali to between 2 and 2.5 poises. Refluxing of the resin mass is continued until a viscosity of 3.5 poises is obtained. The reaction mass at this point has reached the stage where the alkaline salt of the resin is about to be thrown out of solution. Therefore, 14.80 grams of 4 N sodium hydroxide are added. This reduces the viscosity to approximately 0.80 poise on the addition of the alkali. After this addition of alkali, the resin mass is refluxed until a viscosity of 1.5 poises is attained. The resulting aqueous alkaline solution of the resin is then cooled to room temperature. In this example, the molar ratio of the furfural to the phenol is 1.03 moles of furfural to one mole of phenol. The ratio of the alkaline material to the phenol used in producing the initial reaction-product, said alkaline material being expressed as sodium hydroxide, is 0.049 mole of sodium hydroxide to one of the phenol. The ratio of the total alkaline material used in carrying out the process to the phenol, said total amount of alkaline material being expressed as sodium hydroxide, is 1.20 moles of sodium hydroxide to one mole of phenol. This total alkali includes the initial amount of alkaline material functioning as the catalyst in the initial mix. Alkaline materials other than sodium hydroxide, as more specifically herein set forth, may be used in an amount to produce the alkalinity produced by the sodium hydroxide and, therefore, is the full equivalent of the sodium hydroxide.

In producing the resin, many, if not all, of the bases of the alkali metals and the alkaline salts of the alkali metals may be used for solubilizing and for catalyzing during the initial reaction period. The alkaline material functions to raise the pH of the aqueous alkaline solution. Some of the bases of the alkali metals and the alkaline salts of the alkali metals that may be used are the carbonates and hydroxides of sodium, potassium, lithium, barium, calcium, and magnesium. Ammonium hydroxide and ammonium carbonate may also be used. The catalyst during the initial reaction period and during the later addition periods may be organic compounds as, for example, the highly concentrated organic amines such as the ethanol amines. The weaker organic bases and the weaker inorganic salts may be used for raising the pH in the lower pH ranges as, for example, around 9.9 and 9.5 and stronger organic and inorganic alkaline agents may be used to raise the pH in the upper pH ranges. The function of the alkaline material during the addition steps is to raise the pH of the alkaline solution of the phenol - aldehyde condensation product and thereby increase the solubility of the sodium salt of the phenol-aldehyde condensation product in its aqueous alkaline carrying medium. In general, the pH of the final condensation product should vary from about 9 or 9.5 to about 14. The catalyst in the original reaction and the alkaline addition product used later on may be sodium, lithium or potassium phenate. The alkali constituent or the alkaline earth constituent may be combined with the phenol prior to its use. During the initial catalyzing stage and during the later addition stages, the alkali should be present in such a form as to insure its availability for combination with the phenol-aldehyde reaction-product as, for example, phenol-formaldehyde reaction-product during its water-soluble stage. In general, any salt of a phenol may be used which will release an element which will form an alkaline solution, that is, which will release a constituent which when added to the initial condensation product of the phenol and the aldehyde will function to go into solution in the aqueous alkaline medium and form an alkaline salt of the phenol condensation product.

The pH may be measured with a Beckman pH meter with a calomel electrode and a lithium glass electrode and standardized at pH 10 to compensate for the alkali metal ion effect.

As an example of aldehydes which may be condensed with the monohydroxy or dihydroxy phenols or mixtures thereof, there is set forth formaldehyde, acetaldehyde, benzaldehyde, propionic aldehyde, the butyl aldehydes, furfural aldehydes, and the like. Instead of using a single aldehyde, it is within the province of the present invention to react the phenol or mixture of phenols with a mixture of aldehydes as, for example, a mixture of formaldehyde and butylaldehyde. Di-aldehydes may be used in place of the mono-aldehydes.

The amount of alkaline catalyst used in effecting the initial condensation of the phenol and the aldehyde may broadly vary from 1.00% to 8.5% taken on the weight of the phenol and preferably varies between 2.00% and 5.5% or more specifically between 2.08% and 5.32% taken on the weight of the phenol. Expressed differently, the amount of alkaline constituent used for catalyzing the initial reaction between the phenol and the aldehyde should be that amount which is capable of producing an alkalinity equivalent preferably to that produced by 0.049 to 0.125 mole of sodium hydroxide per mole of phenol and more broadly this may vary from 0.025 to 0.20 mole of sodium hydroxide per mole of phenol.

It is recognized that the initial condensation may be effected without the use of an alkaline catalyst and that later on successive additions of the alkaline material may be added for the purpose of resolubilizing the phenol-aldehyde condensation product, all as herein specifically disclosed. However, when the alkaline catalyst is not used, the time for producing the initial condensation product of the aldehyde and the phenol is very substantially increased and, therefore, commercially the initial reaction between the aldehyde and the phenol will be effected in the presence of an alkaline catalyst.

The total amount of alkaline catalyst used in carrying out the process, that is, the initial alkaline material utilized for catalyzing the reaction between the phenol and the aldehyde and the successive additions of alkaline material used for resolubilizing the alkaline salt of the phenol-aldehyde condensation product may vary between 4% and about 85% to 90% taken on the weight of the phenol.

It is desired to point out that the addition of alkaline material as, for example, sodium hydroxide or any equivalent materials, in small quantities while progressing the reaction is helpful in curbing side reactions, such as the Cannizzaro reaction.

As shown by Roger Adams in his book entitled "Organic Reactions," vol. II, 3rd edition, published by John Wiley & Sons, Inc., New York, N. Y., 1944, pages 98 and 99, the Cannizzaro reaction is particularly liable to take place when the concentration of alkali is greater than 10% in the presence of free aldehyde, said percentage of alkali producing a 2.95 normal alkaline solution. If the alkaline material is added in large quantities at high temperatures, it will react with the aldehyde as, for example, formaldehyde, to convert it to methyl alcohol and formic acid, thereby preventing or inhibiting the phenol-formaldehyde condensation. The occurrence of this reaction has been one of the main reasons why it has not been possible prior to the investigations of the present applicant to progress the reaction to the condensation state herein set forth. In accordance with the present invention, the Cannizzaro reaction is limited by the stepwise addition of the alkaline material as, for example, sodium or potassium hydroxide. This procedure reduces the amount of alkali present at a given time while there is also present a large amount of free aldehyde. The stepwise addition of the alkali also controls the reaction rate, that is, the exothermic reaction is decreased, decreasing the velocity or speed of the condensation reaction which makes it commercially feasible to react large quantities of the phenol and the aldehyde without the danger of the reaction reaching an uncontrollable state.

In the examples herein set forth, the phenol per se used, unless otherwise stated, is a 40° C. freezing-point phenol. Usually a small amount of water, usually about 10 parts, is premixed with 100 parts of the phenol to facilitate the handling thereof. However, when percentages or molar ratios herein set forth refer to phenol as a base, said percentages and molar ratios are taken on the phenol before any water has been added thereto. Usually when the phenol is in the kettle, water is added. It may be desirable in carrying out the present process to add all of the water to the phenol or to add only part of the necessary water to carry out the reaction and to later on add the water in increments during the entire process. The solution of the phenol in the water is maintained between 15° C. and 40° C. and to this solution the aldehyde is added. After the aldehyde as, for example, formaldehyde, has been thoroughly mixed with the aqueous solution of phenol and while the temperature is maintained between 15° C. and 40° C., the reaction period is started by the addition of initial amount of alkaline material with constant agitation of the mix. The mix is then gradually heated and the further procedure is as set forth in each of the herein examples. In said examples, the condensation at each step is carried forward to the point where the resin becomes insoluble in its aqueous alkaline solution when cooled at 25° C. This insoluble point is used as the determining point for the addition of more caustic to maintain solubility of the resin, that is, to resolubilize the resin in the alkaline solution which was produced as a result of the initial condensation step. After successive additions of alkaline material, as for example an alkali material, the resin reaches a stage of condensation where it no longer becomes insoluble in an aqueous alkaline solution on further condensation. In other words, the resin becomes permanently soluble in an aqueous alkaline solution, and also permanently soluble in ethanol. Instead of the resin becoming insoluble in the aqueous alkaline solution on further condensation, the viscosity of the resin solution increases. Therefore, the resin that is produced by the repeated addition of an alkaline material and a condensation step between each addition of the alkali, the condensation being carried to the point where the resin becomes insoluble in its aqueous alkaline solution when cooled to 25° C. may not be and usually is not as far advanced to the insoluble infusible C-stage as those resins produced by adding alkali in steps and condensing until the viscosity of the resin is increased, the said viscosity being then decreased by adding additional alkaline material, as set forth in co-pending application Ser. No. 772,016.

Therefore, in one form of the present invention after the initial condensation product is produced, as herein set forth, several successive additions of alkaline material are made to the aqueous alkaline resin solution with a condensation step in between each alkaline addition. Each time, after the alkaline material, the condensation of the resin is carried forward to the point where the resin becomes insoluble in its aqueous alkaline solution when cooled to 25° C., and this insoluble point is used as the determining point for the addition of more alkaline material to maintain the solubility of the resin, that is to resolubilize the resin in the alkaline solution. In order to further advance the state of the resin towards the insoluble infusible C-stage, further alkaline material is added in steps to the resin solution to decrease the rising viscosity. When this rising viscosity is decreased, then the resin is again condensed or heat treated. Condensation will increase the viscosity of the aqueous alkaline solution of the resin and the resin further advanced toward the insoluble infusible C-stage by condensing, that is heating the so-treated resin solution which again functions to increase the viscosity of the resin. This viscosity is again decreased by the addition of alkaline material. The alternate steps of adding an alkaline material to decrease and then condense may be repeated two, three, four or five times, and each time the state of the resin will be advanced towards the insoluble infusible C-stage. It is only by this procedure that the resin can be advanced to a greater state of condensation with more cross linkages and longer chains than any of the prior art resins. After repeated additions of alkaline material, such as an alkali, and alternate condensation, the resin has been advanced or condensed to such a stage that the setting time of the resin whereby it is converted to its final insoluble, infusible state is greatly shortened. In other words, only a short final reaction period is necessary to convert the thermosetting resin to its final insoluble and infusible state where it cannot be further resolubilized by further additions of an alkaline material. Of course, this is what occurs when the resin is used as a plywood adhesive, the thermosetting resin produced by the herein process being applied to the plywood layers and only a short reaction period is necessary to complete the reaction as compared to the normal hot press period at temperatures ranging from 240° to 285° F. When the resin is converted to its final infusible, insoluble state, it cannot be further resolubilized.

The resin of the present invention may be used in the production of plywood. The process is as follows: The resin is mixed with water and a suitable filler or extender, and blended until a uniform lump-free mix is obtained. An illustrative example of a suitable mix is 500 parts of liquid resin, 80 parts of water and 80 parts of walnut-shell flour. The resulting extended resin is spread, usually by a mechanical spreader consisting of two rollers, on both sides of a piece of veneer core stock at the rate of 20 pounds to 80 pounds of resin per one thousand feet of core. The latter is laid upon a piece of veneer face stock, the grain of the veneers being in cross directions. Another piece of veneer stock is placed upon the spread core stock. This cross directional build-up is continued until a panel of the desired thickness is obtained. Usually the number of plies varies from 3 to 7. After the panel is assembled, it is allowed to stand for a definite period of time. This elapsed time is designated as the "stand time," and may vary from one to sixty minutes or more depending on the particular properties of the resin adhesive being used. After the assembled panel has stood for a period of time it is placed in a hot press where it is pressed under suitable pressure and at a suitable temperature for a predetermined length of time. For example, a three ply $\frac{7}{16}$ panel is pressed at 200 pounds per square inch at 140.5° C. for 3.5 minutes. At the end of the pressing cycle, the press is opened and the panels removed.

In the prior art it has not been possible to use water soluble phenol-aldehyde resinous condensation products to improve the fiber in softboards, hardboards or webs so that a strong, smooth, waterproof and hard product is obtained. It has been discovered that the resins prepared in accordance with the present invention are retained on the fibers of the cellulose products of the character above set forth. The resins which are produced by initially condensing a phenol with an aldehyde and thereafter alternately adding an alkaline medium and then condensing are much further advanced toward that state where the thermosetting resin is converetd into its final insoluble, infusible state than the prior art resins. The retention of the resin particles upon the cellulose fibers in the production of the products above set forth is probably due to the fact that the resin is further advanced toward the insoluble, infusible C-stage than the prior art water soluble resins.

The phenol-aldehyde resinous condensation products of the prior art which have been used in cellulose products are characterized by high solubility even in acid solution and because the prior art resins were soluble under those conditions, there was substantially no retention of the resin on the fibers of the cellulose mix from which the final softboard, hardboard or paper web was produced, most of the resin being lost in the white water.

The resins of the present invention are characterized by the property when precipitated by an acid of being insoluble in an aqueous acid solution, and this prevents the resin from penetrating into the interior of the cellulosic fibers. In other words, the resinous phenol-aldehyde condensation product which is very far advanced toward the C-stage, is deposited on the surface of the fiber so that substantially the entire quantity of the resinous condensation product is available to bind the cellulosic fibers together. As stated, when the prior art phenol-aldehyde resins were incorporated in the mix in an attempt to product a softboard, hardboard or paper web or like material, a very substantial portion of the prior art resin penetrated into the interior of the fiber where it could exert no helpful influence on the binding together of the fibers. The exact amount of resin that will be encrusted upon the fiber as compared with the amount which will penetrate into the interior of the fiber mix will, in general, not only depend upon the character of the resin but on the operating conditions under which the particular board or web is made but, in general, the discovery has been made that the resins herein set forth when precipitated in an acid solution in the manufacture of a paper or wallboard slurry are insolubilized and remain on the surface of the fibers constituting the wallboard mix. In general, it may be stated that at least 85% of the resin that has been added to the cellulosic mix or slurry is retained on the fibers. When attempts were made to use water soluble phenol-aldehyde condensation products of the prior art in the production of softboards, hardboards, paper webs and the like, relatively long pressing periods are required because these resins are not as far advanced toward the insoluble, infusible C-stage as are the resins of the present invention. If the time of pressing to convert the thermosetting resin to the insoluble, infusible C-stage is reduced, then a substantial part of the resin may remain unset and be lost when the product is in actual use.

In the use of the present invention in fiber improvement, the water soluble phenol-aldehyde resin condensation product in its advanced stage of condensation produced by a series of alkaline additions with condensation in between each alkaline addition, is added to and evenly dispersed in the paper slurry or web, the slurry being acidified to a pH which will insure substantially complete precipitation of the phenol-aldehyde condensation product from its aqueous solution. The pH of the slurry may vary from 4 to about 9. It is highly desirable to acidify the slurry to a pH of about 4 or 5 and preferably 5 in order to insure complete precipitation or substantially complete precipitation of the resin. However, the resinous phenol-aldehyde condensation product will start precipitating at a much higher pH, even as high as 8 or 9. The precipitating agents are usually alum, hydrochloric acid or sulfuric acid. The pH of an unacidified cellulosic pulp resin slurry suitable for the production of paper is between 10 and 12. The unacidified paper slurry that is used in the production of softboards and hardboards usually has a pH of between 8.5 or 9 to 10 or 10.5. The slurries in the unacidified state are, therefore, alkaline and the resinous condensation product of the present invention when added thereto is in solution in the aqueous alkaline slurry. In order to precipitate the resin it is necessary to acidify the slurry so that its pH is reduced below the neutral point as, for example, to a pH varying between 3 and 6 or 6.5. As stated, the resin will start precipitating at around 8 but in order to insure substantially complete precipitation on the fiber of the slurry, the pH should be reduced to between 3 and 5 or 6. After the acid has been added, the slurry has the excess water removed therefrom usually by a suction action and the fibers are heated to set the resin to the final insoluble, infusible state. In the production of fiber boards, the heating may take place in a press or drying oven. In paper making, the heating is usually effected on calendering rolls.

In the production of pulp and paper board, there is usually formed a slurry of water and waste wood, the latter having been broken down by various mechanical processes or by chemical means or by a combination thereof. The pH of the slurry is adjusted to approximately 7 and the phenol-aldehyde condensation product produced as herein set forth is then added thereto in amounts varying from .5 to 50% based on the dry weight of the pulp solids. In wet strength paper the preferred amounts range from 3 to 18%. In soft and hardboard slurries, the percentage of resin may vary between 1 and 30%, satisfactory results being obtained when about 3½% of the resin is added to the cellulosic fiber slurry adapted to produce paper and when 1½% is added to the cellulosic fiber slurry to produce softboards. These percentages are taken on the dry weight of pulp solids.

After obtaining a uniform dispersion of the resin in the fiber slurry, the resin is precipitated on and in the fiber by reducing the pH of the slurry to 4.5 plus or minus about 1. The fiber slurry containing the precipitated resin is then formed on a screen and the excess water removed by suction. This water may be returned and reused in the process. The pulp mass is then pressed and dried as is usual in the art and the dried mass is hot pressed to convert the thermosetting resin binder adhesive of the mass into a C-stage resin which is the resin in its final insoluble, infusible form.

In the production of softboard or wallboard, the dried paper slurry may be heated to a temperature varying between 300° to 400° F. for a period varying between 4 and 20 minutes and at a pressure varying from 100 to 300 pounds per square inch. In the production of paper web containing the binder of the present invention, the web may be heated at a temperature of 200° F. for approximately one minute. It is to be understood that the temperatures, pressures and times may vary considerably depending on the particular kind of board or paper machine used and the type and quality of the desired product.

The resins of the present invention may also be used to impregnate fibrous materials other than paper as, for example, a web of cloth or any other fibrous material already formed including fabrics formed from mineral fibers. Previously formed webs may be impregnated either by a batch process or by a continuous operation along the sheet or web. In the continuous process of impregnating a fibrous sheet or web of material, the material to be impregnated is run through an aqueous solution of the phenol-aldehyde condensation product produced in accordance with the present invention in a concentration dependent upon the percentage of resin desired in the finished product. After the fibrous material has been completely saturated, it is run from the resin bath through a set of squeegee rolls or doctor blades to remove the excess resin solution. The web is then run through an acidifying bath adjusted to a pH of approximately 4.5 plus or minus 1. This acid bath may contain any of the acids previously mentioned for acidifying and precipitating the resin condensation product on or in the fibrous material. When the sheet is run through the acidifying bath, the phenol-aldehyde condensation product is deposited in situ on and in the fibers of the web. As the web leaves the acidifying bath, it is doctored to remove the excess acid. The web is then passed over and between heat and pressure rolls to set the resin and obtain the desired finish for the web.

If it is desired, a web may be impregnated by resins of the present invention by a batch treatment. In such treatment, the web is placed in a solution of resin which solution is at a concentration depending upon the amount of resin desired in the finished web. When the web has been thoroughly impregnated with the resin by mechanical agitation or other desirable means, the batch is acidified by adding acid of the nature previously set forth to precipitate the resin in and on the fibers of the web. After precipitation of the resin in the fibers of the web, the sheet or web is removed from the batch and then subjected to heat and pressure to set the resin and obtain the desired finish for the web.

I desire to point out that the resin of the present invention will not precipitate when 200 ml. of glacial acetate acid is added slowly to 0.100 gm. of resin on a solid basis dissolved in a mixture of 80 ml. of water and 120 ml. of isopropyl alcohol. The resins set forth in applicant's copending application, Ser. No. 772,016 will exhibit various degrees of precipitation when tested in the same manner.

It is also desired to point out that the resin of the present invention distinguishes from that set forth in the Baekeland Patent No. 1,085,100, wherein there is set forth the preparation of a phenol-aldehyde resin by reacting phenol-formaldehyde resin by reacting phenol-formaldehyde and an alkali catalyst for a definite period of time, and thereafter dilute sodium hydroxide is added. The reaction product is cooled before the sodium hydroxide is added. There is no attempt in the Baekeland procedure to further condense the resin after the addition of the alkali.

In the Nevin U. S. Patent No. 2,150,698 additional alkali is added during the time the resin is cooled, but no attempt is made by Nevin to further condense the resin after the addition of the alkali in order to advance the resin further towards the insoluble and infusible C-stage.

In contrast to the procedures employed by Baekeland and Nevin, in accordance with the present invention, an initial reaction product is made by reacting phenol, formaldehyde and alkali, and then further alkali is added, and again the reaction product is condensed, and this further condensation by heating and the addition of the solubilizing alkali is repeated a number of times. This procedure is continued while retaining the resin in an ethanol and water-soluble stage.

In order to distinguish between the Nevin resin and the Baekeland resin, the procedures of Nevin and Baekeland have been followed and solubility tests made in acetone and isopropyl alcohol; resins prepared in accordance with the present invention, in which the molar ratio of the formaldehyde to the phenol varies from 1:1 to 1.5:1, and phenol-aldehyde resins prepared strictly following the Baekeland and the Nevin disclosures, respectively, gave the following results:

(1) *Solubility in acetone*

|  | Redfern | Nevin | Baekeland |
|---|---|---|---|
| 1 part of resin<br>4 parts of acetone | precipitates | soluble | soluble. |

(2) *Solubility in isopropylalcohol*

|  | Redfern | Nevin | Baekeland |
|---|---|---|---|
| 1 part resin<br>4 parts iso-propyl | precipitates | soluble | soluble. |

(3) *Appearance of resin on acid precipitation of resin*

| Redfern | Nevin | Baekeland |
|---|---|---|
| Pink curdy lumps | Tan gummy mass | Tan gummy mass |

Each of these resins was precipitated from its respective alkaline solutions by adding a pH reducing agent which reduces the pH below the neutral point, preferably to between 4.5 and 5. Any acid may be used as the pH reducing agent or any agent generating an acid ion functioning to reduce the pH below the neutral point. For example, 1 to 4 hydrochloric acid may be used. The acid-precipitated resins were washed with distilled water until free of alkaline material as, for example, sodium, when a sodium compound is used, before being tested for ethanol insolubility.

All of the precipitates dissolve in ethanol, but the order of solubility is: Baekeland (1), Nevin (2), and Redfern (8), in which the numbers refer to the relative time required for complete solubility. In other words, taking equal volumes of the respective resins and dissolving them in equal volumes of alcohol, the Redfern resin of the present invention takes eight times as long to dissolve as the herein set forth Nevin resin or the herein set forth Baekeland resin, all prepared as set forth in said Baekeland and Nevin patents.

In general, it may be stated that it takes from six to ten times longer to substantially completely dissolve the acid precipitated resin of the present invention in ethanol than to dissolve a second acid precipitated resin produced by boiling 100 gms. of phenol, ½ gm. of sodium hydroxide and 90 gms. of a 37% commercial formaldehyde solution until the liquid separates into two layers, thereafter cooling to 20° C. and adding a 4% solution of sodium hydroxide, this being the resin set forth in the Baekeland patent No. patent, respectively:

The following table gives the cure time, i. e., the length of time for $\frac{1}{16}$ millimeter of the resin of the present invention to become non-tacky when stroking with a spatula on a hot plate at 285° F., the cure time being compared with that of resins produced in accordance with the disclosures of the Nevin patent and the Baekeland patent, respectively:

| Redfern | Nevin | Baekeland |
|---|---|---|
| 5–7 seconds | 15 seconds | 23 seconds |

In general, the resin of the present invention is so far advanced towards the insoluble, infusible C-stage that it cures to a non-tacky, insoluble, infusible state at 295° F. in from four to eight or nine seconds, which is a much quicker time of cure than that possessed by any of the prior art resins, it being assumed that an equal volume of the resin of the present invention is compared with an equal volume of the prior art resins.

In all the examples specifying phenol, it is to be understood that technically pure phenol is used. It is to be understood that the phenols of the present invention may contain more than 15% of at least one phenol selected from the group consisting of orthocresol, ortho xylenol, and mixtures thereof. However, of course, it is within the province of the present invention to use phenols which do not contain more than 15% of orthocresol, ortho xylenol or mixtures thereof.

I desire to point out that the alternate steps of adding an alkaline material and then condensing may be repeated several times. Usually, it is repeated at least three times, and it may be repeated as many as five, six, seven or eight times. In other words, the alkaline material may be added in three, four, five, six, seven, eight, or more steps, with a heat treatment in between at or near the reflux temperature of the reaction-product to thereby advance the resin of the present invention towards the insoluble infusible C-stage, but said stage is never reached.

It has been discovered that a phenol-aldehyde resin of the character set forth may be used in the bonding of a plurality of cellulosic boards one to the other at hot-press temperatures in a shorter period of time than has been hitherto possible using the prior art monohydric phenol-aldehyde resins. Stated differently, it has been discovered that at a hot-press temperature varying between 230° and 330° F. inclusive, and preferably between 240° and 285° F., the cellulose members such as wooden boards or plywood boards may be united or bonded or hot-pressed together in a period of time which is 10% to 15% less than the period of time necessary to hot-press under similar conditions an assembly containing the prior art phenol-aldehyde resins and particularly the monohydric phenol-aldehyde resins. It may be pointed out that a number of factors are involved in the bonding or construction of wooden members as, for example, plywood, such as the moisture contents and temperatures of the veneer plies, the length of stand time, and the amount of spread of the resin adhesive on the plywood elements. In view of these factors, the actual difference in pressing times of wooden and plywood assemblies employing the resins of the present invention and the prior art resins are materially less than the difference in the cure time on a hot plate of the resins utilized in carrying out the present invention and the prior art phenol-aldehyde condensation product, including the prior art monohydric phenol-aldehyde condensation products which are well exemplified by the condensation product of phenol per se $C_6H_5OH$ and formaldehyde.

From a process standpoint, the method of this phase of the present invention comprises bonding a plurality of cellulose members one to the other at hot-press temperatures varying from 230° to 330° F. comprising shortening the period of time that it takes to bond or adhere said units one to the other by applying to said units a thermosetting phenol-aldehyde final reaction-product of a monohydric phenol having a distillation range from between about 175° C. to 225° C., an aldehyde in which the aldehyde group is the sole reactive group, and an alkaline catalyst accelerating the formation of the resin reaction product on heating, the molar ratio of the aldehyde to the phenol varying broadly from 1:1 to 3:1 and more narrowly from 1:1 to 1.5:1. The so-produced assembly carrying the above set forth binder which is well advanced toward its insoluble, infusible state is subjected to a hot-press temperature varying between 200 and 330° F. for a period of time which is 10% to 15% less than the period of time necessary to set the prior art phenol-aldehyde resins.

It has also been discovered that when the phenol-aldehyde resins produced as herein set forth are used in the production of boards, webs and other cellulosic products, the resins are retained on the surface of the fibers and are available to bond the fibers together.

It is desired to point out that it has been discovered that particles of the herein resin when present in an acid or neutral slurry of cellulose fibers are retained on the surface of the fibers. This discovery represents a significant advance in the art, since it is now possible to successfully use water-soluble phenol-aldehyde thermosetting resins in acid slurries, this being principally due probably to the insolubility of the alkaline salt of the phenol-aldehyde resin in the slurry.

More specifically, it has been discovered that the particles of the herein produced resin do not penetrate into the interior of the fibers as do the prior art water soluble or solvent type of phenol aldehyde resins. Further, a high percentage of the prior art phenol-aldehyde condensation products remain soluble in the fiber slurry and are lost when the water is removed from the slurry prior to the application of heat to consolidate the fiber contents of the slurry. In view of the high loss of resin, it was previously necessary to use excessive quantities of the prior art water soluble or solvent type resins in the initial fiber slurries in order that sufficient of the phenol-aldehyde condensation resin be retained by the fibers to impart to the ultimate product the necessary binding strength. In order to reduce the cost of operation because of the excessive amounts of resins used, it was necessary to provide elaborate white water recovery systems which were so highly expensive as to make the production of wallboards utilizing the prior art resins substantially impractical.

In view of the above, in the production of wallboards and other products herein set forth, resins of the solvent type were used. Resins of this character may be advanced to the stage where their insolubility in the fiber slurries after the removal of the solvent is such that they remain on the fibers and impart the necessary bonding strength to the ultimate product without the use of excessive resin. However, the process of the prior art employing said resins is highly disadvantageous in that the first cost due to the use of solvent resins and the solvent is exceedingly high. Further, it is necessary to install solvent recovery systems.

Where penetration of the character above set forth occurs, it is impractical to use the resin phenol-aldehyde binder in the production of softboards, wallboards, hardboards, paper webs, and the like.

It has been discovered that the herein produced resins exhibit a high degree of insolubilization in acid or neutral solutions and are retained on the fibers when added to a slurry of cellulose fibers which is acidified, said slurry preferably having a pH varying between 3 and 10, but desirably between 3 and 7.

It has also been discovered that employing the present resins in the production of boards there is relatively little tendency for the resin to flow to the surface and edges of the fiber product while the solvent and excess water are being removed and during the period when the board is being cured or hot-pressed. Employing the prior art water soluble or solvent type of phenol-aldehyde resins, a poor board was produced, said board having a high concentration of resin contained on the faces and edges of the board producing a hard exterior surface, but at the same time the interior of the board was relatively low in resin content and, therefore, was soft and poorly bonded in the center.

In producing boards in accordance with the present invention, the following advantages are obtained:

(1) The resin molecule does not penetrate into the fiber, this being due, it is thought, to the large molecular rate or size of the resin even when it is in alkaline solution. When the resins produced as herein set forth are precipitated, they are precipitated on the surface of the fiber. In carrying out the process, therefore, the entire amount of resin added is present to give the required bonding strength. A better and more uniform distribution of the resin and the fibers are retained and a lower percentage of resin may be used than when carrying out the prior art processes. In general, the resin may be present in the slurry in amounts varying between 0.5% and 15% and preferably between 1.5% and 3.5%, or even more narrowly between 1.0% and 3.0% taken on the dry weight of the fiber content of the slurry.

(2) No elaborate recovery systems are necessary. In processes now in use in the art employing either solvent or water soluble resins, solvent or white water recovery systems are necessary. Because of the high degree of insolubility of the resins herein set forth in an acid solution, the resins adhere to the cellulose fibers and relatively little of the resin is lost in the white water. Therefore, it is not necessary to recover the resin present in the white water. Laboratory experiments show that the fibers retain 95% of the resin. In commercial practice, this is slightly less and usually around 85% to 90%.

(3) In carrying out the present invention, after the highly advanced water soluble phenol-aldehyde resins herein set forth have been acid precipitated, there is very little flow of these resins into the fibers and, therefore, the resins remain in situ during the dehydration and pressing cycles resulting in an exceedingly uniform and stable fiber product.

The following is an example illustrative of the manufacture of wall boards utilizing the resins herein set forth. An aqueous pulp of cellulosic fibers produced in a McMillan defiberizer has added thereto 3.5% of the resin produced as herein set forth, said resin being water soluble and showing a precipitate on the addition of ethanol. There may be also added to the pulp any of the prior art sizes, as for example .5% of a paraffin size. These percentages are on a solids basis, that is taken on the weight of the substantially dry cellulosic fibers prior to their admixture with water to form a slurry. The pH of the resin pulp mixture is maintained at about 9.5 to 9.8. Since the resin is water soluble in an alkaline solution, the resin does not precipitate. The resin remains in solution for a suitable period of time. Thereafter there is added to the cellulose slurry powdered alum for the purpose of precipitating the resin, the pH of the slurry being adjusted to the acid side, as for example to approximately 5.5, although obviously this can be greatly varied. The usual pH meter is used in adjusting the pH of the aqueous slurry.

The resins herein set forth may be used in the production of hardboards, softboards and other fiber products utilizing a dry process. In this process the fiber is not dispersed in a wet slurry but instead after the fiber is mechanically or chemically separated into individual fibers or small bundles of individual fibers, the latter is mechanically mixed with a solution of the resin in a tumbler kneader or a similar suitable mixing and disbursing apparatus. Employing this process, the resin is not acid precipitated on the fiber, but instead remains in solution. However, because of the low degree of penetration of the herein set forth resins into the fiber, the resin is retained on and surface coats the individual fibers so that when they are bonded together on heat and pressure, a much stronger bond is obtained than when a prior art resin is used. After the resin is uniformly dispersed on the dry fiber, the fiber is removed to a forming frame where it is uniformly distributed by suitable type equipment. Thereafter, the so-treated fiber is transferred to a hot-press where it is subjected to sufficient temperature and pressure to bond the individual fibers together. Usually the temperature and pressure employed in this dry fiber process is much greater than that used in the wet-slurry process.

In utilizing the resins of the present invention in the production of plywood or the production of fiber products such as hardboards, softboards, wallboards and the like, the resin may be mixed with various fillers both reactive and non-reactive such as walnut shell flour, wood flour, fir bark, lignin, and the like to improve the product, said fillers resulting in a better dispersion of the resin with the consequent reduction of shrinkage of the product and low water absorption.

The present application is a continuation-in-part of application Serial No. 772,016, filed September 3, 1947, now Patent No. 2,457,493, reissued as Reissue No. 23,347, said application Serial No. 772,016 being a continuation-in-part of application Serial No. 722,975, filed January 18, 1947, now abandoned, the latter being a continuation-in-part of application Serial No. 510,209, filed November 13, 1943, now abandoned.

I claim:

1. The method of producing a thermosetting phenol-aldehyde condensation product comprising forming an aqueous mixture of a monohydric phenol having a distillation range between 175° C. and 225° C., an aldehyde in which the aldehyde group is the sole reactive group, and an alkaline catalyst accelerating the formation of the resin reaction-product on heating, said catalyst being present in an amount not over 10% taken on the weight of the phenol, the molar ratio of the aldehyde to the phenol varying from 1:1 to 1.5:1, heat-reacting said mix until the resin reaction-product is substantially insoluble in the aqueous alkaline solution as evidenced by the solution becoming cloudy when a sample thereof is cooled to 25° C., adding alkali metal hydroxide to solubilize the resin reaction-product and heat-reacting until the resin reaction-product again becomes insoluble in the aqueous alkaline solution as evidenced by a sample of said solution becoming cloudy when cooled to 25° C., and continuing said alternate steps of adding alkali metal hydroxide to solubilize the resin in its alkaline solution and heat-treating and further condensing the resin until the resin becomes insoluble in the aqueous alkaline solution, said resin then being permanently ethanol-soluble, and permanently soluble in its aqueous alkaline solution.

2. The method of producing a thermosetting phenol-aldehyde condensation-product comprising forming an aqueous mixture of a monohydric phenol having a distillation range between 175° C. and 225° C., an aldehyde in which the aldehyde group is the sole reactive group, and an alkaline catalyst accelerating the formation of the resin reaction-product on heating, said catalyst being present in an amount not over 10% taken on the weight of the phenol, the molar ratio of the aldehyde to the phenol varying from 1:1 to 1.5:1, heat-reacting said mix until the resin reaction-product is substantially insoluble in the aqueous alkaline solution as evidenced by the solution becoming cloudy when a sample thereof is cooled to 25° C., adding alkali metal hydroxide to solubilize the resin reaction-product and heat-reacting until the resin reaction-product again becomes insoluble in the aqueous alkaline solution as evidenced by a sample of said solution becoming cloudy when cooled to 25° C., continuing said alternate steps of adding alkali metal hydroxide to solubilize the resin in its alkaline solution and heat-treating and further condensing the resin until the resin becomes insoluble in the aqueous alkaline solution, said resin then being permanently ethanol-soluble and water-soluble, said alternate steps of adding alkali metal hydroxide to the initial condensation-product and thereafter condensing being practiced at least three times to advance the resin towards, but never attaining, its insoluble and infusible state.

3. The method of producing a thermosetting phenol-aldehyde condensation-product comprising forming an aqueous mixture of a monohydric phenol having a distillation range between 175° C. and 225° C., furfural, and an alkaline catalyst accelerating the formation of the resin reaction-product on heating, said catalyst being present in an amount not over 10% taken on the weight of the phenol, the molar ratio of the aldehyde to the phenol varying from 1:1 to 1.5:1, heat-reacting said mix until the resin reaction-product is substantially insoluble in the aqueous alkaline solution as evidenced by the solution becoming cloudy when a sample thereof is cooled to 25° C., adding alkali metal hydroxide to solubilize the resin reaction-product and heat-reacting until the resin reaction-product again becomes insoluble in the aqueous alkaline solution as evidenced by a sample of said solution becoming cloudy when cooled to 25° C., continuing said alternate steps of adding alkali metal hydroxide to solubilize the resin in its alkaline solution and heat-treating and further condensing the resin until the resin becomes insoluble in the aqueous alkaline solution, said resin then being permanently ethanol-soluble and water-soluble.

4. The product of the method of claim 1.

5. The method of producing a thermosetting phenol-aldehyde condensation product comprising forming an aqueous mixture of a monohydric phenol having a distillation range between 175° C. and 225° C., an aldehyde in which the aldehyde group is the sole reactive group, and an alkaline catalyst accelerating the formation of the resin reaction-product on heating, said catalyst being present in an amount not over 10% taken on the weight of the phenol, the molar ratio of the aldehyde to the phenol varying from 1:1 to 1.5:1, heat-reacting said mix until the resin reaction-product is substantially insoluble in the aqueous alkaline solution as evidenced by the solution becoming cloudy when a sample thereof is cooled to 25° C., adding alkali metal hydroxide to solubilize the resin reaction-product and heat-reacting until the resin reaction-product again becomes insoluble in the aqueous alkaline solution as evidenced by a sample of said solution becoming cloudy when cooled to 25° C., and continuing said alternate steps of adding alkali metal hydroxide to solubilize the resin in its alkaline solution and heat-treating and further condensing the resin until the latter is insoluble in its alkaline solution and is ethanol-soluble, continuing the condensation of the resin until the latter is no longer insoluble in its aqueous alkaline solution but the viscosity of the resin increases, and thereafter subjecting the resulting alkaline solution of the resin to repeated additions of alkali metal hydroxide with a condensation step in between each addition of alkali metal hydroxide, each addition thereof functioning to decrease the viscosity of the resin solution which was increased by the condensation step.

6. The method of producing a thermosetting phenol-formaldehyde condensation product comprising forming an aqueous mixture of a monohydric phenol having a distillation range between 175° C. and 225° C., formaldehyde, and an alkaline catalyst accelerating the formation of the resin reaction-product on heating, said catalyst being present in an amount not over 10% taken on the weight of the phenol, the molar ratio of the formaldehyde to the phenol varying from 1:1 to 1.5:1, heat-reacting said mix until the resin reaction-product is substantially insoluble in the aqueous alkaline solution as evidenced by the solution becoming cloudy when a sample thereof is cooled to 25° C., adding alkali metal hydroxide to solubilize the resin reaction-product and heat-reacting until the resin reaction-product again becomes insoluble in the aqueous alkaline solution as evidenced by a sample of said solution becoming cloudy when cooled to 25° C., and continuing said alternate steps of adding alkali metal hydroxide to solubilize the resin in its alkaline solution and heat-treating and further condensing the resin until the resin becomes insoluble in the aqueous alkaline solution, said resin then being permanently ethanol-soluble and permanently soluble in its aqueous alkaline solution.

7. The product of the method of claim 6.

8. The method of bonding a plurality of components of base material together comprising applying to said base material the highly condensed thermosetting phenol-aldehyde resin-reaction product formed by heat-reacting an aqueous mixture of a monohydric phenol having a distillation range between 175° and 225°, an aldehyde in which the aldehyde radical is the sole reactive radical, and an alkaline catalyst in an amount accelerating the formation of the initial reaction product on heating, the molar ratio of the aldehyde to the phenol varying from 1:1 to 1.5:1, said initial resin reaction product being well advanced toward its final insoluble infusible stage by the repeated addition thereto of alkali metal hydroxide with a condensation step between each addition of alkali metal hydroxide until the resin reaction product becomes insoluble in the aqueous alkaline solution, the final condensation product after repeated additions of alkali metal hydroxide and repeated condensation steps being ethanol-soluble and water-soluble, and hot-pressing the resulting mass containing said thermosetting bonding and adhering material until the latter is converted to its insoluble infusible state.

9. The method of producing a composite wooden unit having individual layers at a hot-press temperature comprising applying to said layers the highly condensed thermosetting phenol-aldehyde resin-reaction product formed by heat-reacting an aqueous mixture of a monohydric phenol having a distillation range between 175° and 225° F., an aldehyde in which the aldehyde radical is the sole reactive radical, and an alkaline catalyst in an amount accelerating the formation of the initial reaction product on heating, the molar ratio of the aldehyde to the phenol varying from 1:1 to 1.5:1, said initial resin reaction product being well advanced toward its final insoluble infusible stage by the repeated addition thereto of alkali metal hydroxide with a condensation step between each addition of alkali metal hydroxide until the resin reaction product becomes insoluble in the aqueous alkaline solution, the final condensation product after repeated additions of alkali metal hydroxide and repeated condensation steps being ethanol-soluble and water-soluble, and hot-pressing the assembly containing said thermosetting bonding and adhering resin until the latter is converted to its insoluble infusible state.

10. The method of producing a cellulose product bonded with an insoluble infusible phenol-aldehyde resin comprising forming a composite unit containing cellulose components and a highly condensed thermosetting phenol-aldehyde resin-reaction product formed by heat-reacting an aqueous mixture of a monohydric phenol having a distillation range between 175° and 225° F., an aldehyde in which the aldehyde radical is the sole reactive radical, and an alkaline catalyst in an amount accelerating the formation of the initial reaction product on heating, the molar ratio of the aldehyde to the phenol varying from 1:1 to 1.5:1, said initial resin reaction product being well advanced toward its final insoluble infusible stage by the repeated addition thereto of alkali metal hydroxide with a condensation step between each addition of alkali metal hydroxide until the resin reaction product becomes insoluble in the aqueous alkaline solution, the final condensation product after repeated additions of alkali metal hydroxide and repeated condensation steps being ethanol-soluble and water-soluble, and hot-pressing the resulting mass of cellulose components until said thermosetting bonding material is converted to its insoluble infusible state.

11. The method defined in claim 8 in which the cellulose component is plywood, the aldehyde is formaldehyde, and the alkali metal hydroxide is sodium hydroxide.

12. The method of bonding a plurality of units of base material at a hot-press temperature comprising applying to said units the highly condensed thermosetting phenol-aldehyde resin-reaction product formed by heat-reacting an aqueous mixture of a monohydric phenol having a distillation range between 175° and 225° F., an aldehyde in which the aldehyde radical is the sole reactive radical, and an alkaline catalyst in an amount accelerating the formation of the initial reaction product on heating, the molar ratio of the aldehyde to the phenol varying from 1:1 to 1.5:1, said resin reaction product being well advanced toward its final insoluble infusible stage by the repeated addition thereto of alkali metal hydroxide with a condensation step between each addition of alkali metal hydroxide until the resin reaction product becomes insoluble in the aqueous alkaline solution, the final condensation product after repeated additions of alkali metal hydroxide and repeated condensation steps being ethanol-soluble and water-soluble, and hot-pressing the assembly containing said thermosetting bonding and adhering material until the latter is converted to its insoluble infusible state and for a time period which is between 10% and 15% less than it takes to hot-press a substantially identical composite unit structure under substantially identical operating conditions, said latter composite structure having as its binding medium a phenol-aldehyde resin produced otherwise than by repeated additions to a phenol-aldehyde condensation product of an alkali metal hydroxide and a condensation step between each addition of alkali metal hydroxide.

13. The method of forming a cellulose fiber product bonded with an insoluble infusible phenol-aldehyde resin comprising forming a mixture of an aqueous acid slurry containing cellulose fibers, a thermosetting resin-reaction product formed by heat-reacting an aqueous mixture of a monohydric phenol having a distillation range between about 175° and 225° F., an aldehyde in which the aldehyde radical is the sole reactive radical, and an alkaline catalyst in an amount accelerating the formation of the initial reaction product on heating, the molar ratio of the aldehyde to the phenol varying from 1:1 to 1.5:1, said initial resin reaction product being well advanced toward its final insoluble infusible stage by the repeated addition thereto of alkali metal hydroxide with a condensation step between each addition of alkali metal hydroxide until the resin reaction product becomes insoluble in the aqueous alkaline solution, the final condensation product after repeated additions of alkali metal hydroxide and repeated condensation steps being ethanol-soluble and water-soluble, said resin reaction product being normally water-soluble in alkaline solution but interacting in the presence of said acid slurry to precipitate on the cellulose fibers a substantially insoluble resin retained on and in said fibers in solid state, deliquefying the resulting slurry, and heat-converting the deliquefied slurry into a dried rigid consolidated fiber product with said thermosetting phenol-aldehyde resin converted to its insoluble infusible state and uniformly distributed throughout the interior and on and adjacent the surfaces of said consolidated fiber product.

14. The method defined in claim 13 in which the phenol-aldehyde resin is incorporated in the slurry in an amount between the limits of about 0.5% and about 3.5% taken on the dry weight of the cellulose fiber present in the slurry.

15. The method defined in claim 14 in which the aldehyde is formaldehyde and the alkali metal hydroxide is sodium hydroxide.

16. The method defined in claim 13 in which the deliquefied slurry is heat-converted to a dry rigid consolidated fiber product at a temperature between the limits of about 200° and about 330° F.

17. The method defined in claim 16 in which the aldehyde is formaldehyde and the alkali metal hydroxide is sodium hydroxide.

18. The heat and pressure consolidated assembly of cellulose units bonded with an infusible water-insoluble thermoset phenol-aldehyde resin recovered from the resin-reaction product formed by heat-reacting an aqueous mixture of a monohydric phenol having a distillation range between 175° and 225° F., an aldehyde in which the aldehyde radical is the sole reactive radical, and an alkaline catalyst in an amount accelerating the formation of the initial resin-reaction product on heating, the molar ratio of the aldehyde to the phenol varying from 1:1 to 1.5:1, said initial resin reaction product being well advanced toward the insoluble infusible state by the repeated addition thereto of alkali metal hydroxide with a condensation step between each addition of alkali metal hydroxide until the resin becomes insoluble in the aqueous solution, the final condensation product after repeated condensation steps being ethanol-soluble and water-soluble, said resin being substantially uniformly distributed throughout the interior and on and adjacent the surfaces of the bonded cellulose units.

19. The heat and pressure consolidated assembly of cellulose units defined in claim 18 in which the units are bonded with between 0.5% and 3.5% of the thermosetting phenol-aldehyde resin-reaction product, said percentages being taken on the dry weight of the cellulose units.

20. The method defined in claim 19 in which the aldehyde is formaldehyde and the alkali metal hydroxide is sodium hydroxide.

21. The heat and pressure consolidated assembly of cellulose units defined in claim 18 in which the cellulose unit is a plywood unit.

22. The heat and pressure consolidated assembly of cellulose units defined in claim 18 in which the aldehyde is formaldehyde and the alkali metal hydroxide is sodium hydroxide.

23. The heat and pressure consolidated article comprising a plurality of base material units bonded with a thermosetting phenol-aldehyde resin-reaction product formed by heat-reacting an aqueous mixture of a monohydric phenol having a distillation range between 175° and 225° F., an aldehyde in which the aldehyde radical is the sole reactive radical, and an alkaline catalyst in an amount accelerating the formation of the initial resin-reaction product on heating, the molar ratio of the aldehyde to the phenol varying from 1:1 to 1.5:1, said initial resin reaction product being well advanced toward the insoluble infusible state by the repeated addition thereto of alkali metal hydroxide with a condensation step between each addition of alkali metal hydroxide until the resin becomes insoluble in the aqueous solution, the final condensation product after repeated condensation steps being ethanol-soluble and water-soluble.

24. The method of bonding a plurality of components of base material together comprising applying to said base material the highly condensed thermosetting phenol-aldehyde resin-reaction product formed by heat-reacting an aqueous mixture of a monohydric phenol having a distillation range between 175° and 225° F., an aldehyde in which the aldehyde radical is the sole reactive radical, and an alkaline catalyst in an amount accelerating the formation of the initial reaction product on heating, the molar ratio of the aldehyde to the phenol varying from 1:1 to 1.5:1, said initial resin reaction product being well advanced toward its final insoluble infusible stage by the repeated addition thereto of alkali metal hydroxide with a condensation step between each addition of alkali metal hydroxide until the resin becomes insoluble in the aqueous alkaline solution, then continuing said alternate steps of adding alkali metal hydroxide to solubilize the resin in its alkali solution and condensing the resin until the latter is no longer insoluble in its aqueous alkaline solution but on condensation the viscosity of the resin increases, and hot-pressing the resulting mass containing said thermosetting bonding and adhering resin until the latter is converted to its insoluble infusible state.

25. The method defined in claim 8 in which the aldehyde is formaldehyde and the alkali metal hydroxide is sodium hydroxide.

26. The method defined in claim 10 in which the aldehyde is formaldehyde and the alkali metal hydroxide is sodium hydroxide.

27. The method defined in claim 13 in which the aldehyde is formaldehyde and the alkali metal hydroxide is sodium hydroxide.

28. The method defined in claim 6 in which the alkali metal hydroxide is sodium hydroxide.

29. The product of the method of claim 28.

30. The method of producing a thermosetting phenol formaldehyde condensation product comprising forming an aqueous mixture of a monohydric phenol having a distillation range between about 175° C. and about 225° C., formaldehyde, and caustic soda accelerating the formation of the resin reaction product on heating, the molar ratio of the formaldehyde to the phenol varying from 1:1 to 1.5:1, heat-reacting said initial resin reaction product until the latter is substantially insoluble in an aqueous solution of caustic soda as evidenced by the solution becoming cloudy when a sample thereof is cooled to 25° C., adding additional caustic soda to the so-heat-reacted resin reaction product to solubilize the latter, and heat-reacting until the resin reaction product again becomes insoluble in the aqueous solution of caustic soda as evidenced by a sample of said solution becoming cloudy when cooled to 25° C., and continuing said alternate steps of adding caustic soda to solubilize the resin in its caustic alkali solution and heat-treating and further condensing the resin until the resin becomes insoluble in the aqueous caustic soda solution, said resin then being permanently ethanol-soluble and permanently soluble in its caustic soda solution, the total caustic soda used in the process being between 0.10 and 2.00 moles of caustic soda per mole of monohydric phenol.

31. The product of the method of claim 30.

32. The method of forming a cellulose fiber product bonded with an insoluble infusible phenol-aldehyde resin comprising forming a mixture of an aqueous alkaline slurry containing cellulose fibers and a thermosetting resin-reaction product formed by heat-reacting an aqueous mixture of a monohydric phenol having a distillation range between about 175° and about 225° C., an aldehyde in which the aldehyde radical is the sole reactive radical, and an alkaline catalyst in an amount accelerating the formation of the initial resin-reaction product on heating, the molar ratio of the aldehyde to the phenol varying from 1:1 to 3:1, said initial reaction product being well advanced toward its final insoluble infusible stage by the repeated addition thereto of alkali metal hydroxide with a condensation step between each addition of alkali metal hydroxide until the resin-reaction product becomes insoluble in the aqueous alkaline solution, the final condensation product after repeated additions of alkali metal hydroxide and repeated condensation steps being ethanol-soluble and water-soluble in said alkaline slurry, acidifying said alkaline slurry to precipitate out of solution and on said fibers a highly condensed substantially insoluble phenol-aldehyde resin, the latter being retained on and in said fibers in a solid state, deliquefying the resulting slurry, and heat-converting the deliquefied slurry into a dried rigid consolidated fiber product with said thermosetting phenol-formaldehyde resin converted to its insoluble infusible state and uniformly distributed throughout the interior and on and adjacent the surfaces of said consolidated fiber product.

33. The heat-and-pressure-consolidated board of cellulose fibers bonded with an infusible water-insoluble thermoset phenol-aldehyde resin recovered from the resin reaction product formed by heat-reacting an aqueous mixture of a monohydric phenol having a distillation range between about 175° and about 225° C., an aldehyde in which the aldehyde radical is the sole reactive radical, and an alkaline catalyst in an amount accelerating the formation of the initial resin-reaction product, the molar ratio of the aldehyde to the phenol varying from 1:1 to 3:1, said initial resin-reaction product being well advanced toward the insoluble infusible state by the repeated addition thereto of alkali metal hydroxide with a condensation step between each addition of alkali metal hydroxide until the resin becomes insoluble in the aqueous solution, the final condensation product produced after repeated condensation steps being ethanol-soluble and water-soluble, said recovered infusible water-insoluble thermoset resin being substantially uniformly distributed throughout the board, said bonding thermoset resin material and cellulose fibers forming a majority of the constituents of the board.

34. Hot-pressed plywood glued with the phenol-aldehyde resin produced by the method of claim 1.

35. Paper composed of cellulose fibers bonded together by the heat-cured insoluble infusible phenol-aldehyde resin produced by the method of claim 1.

DONALD V. REDFERN.

REFERENCES CITED

The following references are of record in the file of this patent:

UNITED STATES PATENTS

| Number | Name | Date |
|---|---|---|
| Re. 23,347 | Redfern | Mar. 20, 1951 |
| 1,776,366 | Novotny | Sept. 23, 1930 |
| 1,885,066 | Warren et al. | Oct. 26, 1932 |
| 2,068,759 | Nevin | Jan. 26, 1937 |
| 2,215,245 | King et al. | Sept. 17, 1940 |
| 2,215,246 | Gill | Sept. 17, 1940 |
| 2,232,718 | Nevin | Feb. 25, 1941 |
| 2,338,602 | Schur | Jan. 4, 1944 |
| 2,360,376 | Van Epps | Oct. 17, 1944 |
| 2,385,372 | Rhodes | Sept. 25, 1945 |
| 2,397,323 | Trefz et al. | Mar. 26, 1946 |
| 2,414,414 | Rhodes | Jan. 14, 1947 |
| 2,414,415 | Rhodes | Jan. 14, 1947 |
| 2,437,710 | Rhodes | Mar. 16, 1948 |
| 2,476,347 | Allan | July 19, 1949 |